United States Patent [19]

Wikman et al.

[11] Patent Number: 5,290,342
[45] Date of Patent: Mar. 1, 1994

[54] SILANE COMPOSITIONS AND PROCESS
[75] Inventors: Andrew O. Wikman; Won S. Park; Charles R. Everly, all of Baton Rouge, La.
[73] Assignee: Ethyl Corporation, Richmond, Va.
[21] Appl. No.: 873,461
[22] Filed: Apr. 24, 1992

Related U.S. Application Data

[62] Division of Ser. No. 622,771, Dec. 5, 1990, abandoned.
[51] Int. Cl.$^5$ .............................................. B01D 53/04
[52] U.S. Cl. ...................................... 95/143; 95/106; 95/148; 95/901
[58] Field of Search .......................... 55/72, 74, 387; 423/347

[56] References Cited

U.S. PATENT DOCUMENTS

| | | | |
|---|---|---|---|
| 2,882,243 | 4/1959 | Milton | 252/455 |
| 2,971,607 | 2/1961 | Caswell | 183/114.2 |
| 2,987,139 | 6/1961 | Bush | 183/114.2 |
| 3,019,087 | 1/1962 | Jacob et al. | 23/204 |
| 3,031,268 | 4/1962 | Shoemaker | 23/204 |
| 3,041,141 | 6/1962 | Shoemaker et al. | 23/204 |
| 3,043,664 | 7/1962 | Mason et al. | 23/204 |
| 3,078,636 | 2/1963 | Milton | 55/63 |
| 3,078,645 | 2/1963 | Milton | 55/75 |
| 3,778,387 | 12/1973 | Urbanic et al. | 55/74 X |
| 3,968,199 | 7/1976 | Bakay | 423/347 |
| 4,099,936 | 7/1978 | Tarancon | 55/75 |
| 4,224,040 | 9/1980 | Gazzarrini et al. | 55/72 X |
| 4,340,574 | 7/1982 | Coleman | 423/347 |
| 4,532,120 | 7/1985 | Smith et al. | 423/347 |
| 4,537,759 | 8/1986 | Walker et al. | 423/349 |
| 4,554,141 | 11/1985 | Scull et al. | 423/245 |
| 4,632,816 | 12/1986 | Marlett | 423/347 |
| 4,772,296 | 9/1988 | Potts | 55/72 X |
| 4,933,162 | 6/1990 | Vansant et al. | 423/488 |
| 4,976,944 | 12/1990 | Pacaud et al. | 55/74 X |
| 5,051,117 | 9/1991 | Prigge et al. | 55/72 X |
| 5,075,092 | 12/1991 | Boone et al. | 423/347 |

FOREIGN PATENT DOCUMENTS 48-41437 12/1973 Japan.
48-41439 12/1973 Japan.
52-27625 7/1977 Japan.

OTHER PUBLICATIONS

Chemical Abstracts, CA84-172769h, Ultrahigh Purification of Silane for Semiconductor Silicon, Yusa et al., Japan.
Chemical Abstracts, CA79-138335a, Purification of Silane, Muraoka et al., Japan.
Chemical Abstracts, CA80-138464n, Purification of Monosilane Useful as a Raw Material for Semiconductors, Kuratomi et al., Japan.
Chemical Abstracts, CA81-140458c, Purification of Poisonous Gas Produced in the Semiconductor Manufacturing Process, Watanabe, Japan.
Chemical Abstracts, CA82-158318n, Purification of Silane, Asano et al., Japan.
Chemical Abstracts, CA89-131816f, Purification of Silane, Tarancon, USA (Ger. Offen. 2,755,824).
Chemical Abstracts, CA92-167081p, Purification of Silane, Union Carbide Corp. (Neth. Appl. 78 03,471).
Chemical Abstracts, CA94-194253u, Purification of Monosilane, Lebedev et al., USSR.
Chemical Abstracts, CA97-200298t, Purification of Chlorosilanes by Distillation, Carvalho et al., Brazil.
Chemical Abstracts, CA99-55843b, Monosilane Purification, Japan.
Chemical Abstracts, CA84-166812a, Production and Purification of Monosilane, Yushkov et al., USSR.
Yusa et al., "Ultrahigh Purification of Silane for Semiconductor Silicon," J. Electrochem. Soc., vol. 122, No. 12, Dec. 1975, pp. 1700-1705.
Lorenz, "A Survey of the Preparation, Purity, and Availability of Silanes,"-A Subcontract Report for the Department of Energy, Subcontract No. CL-3-003-21-01, Dec. 1983.
Lewis et al., "Preparation of High-Purity Silicon from Silane," Journal of the Electrochemical Society, vol. 108, No. 12, Dec. 1961, pp. 1114-1118.
Chemical Abstracts, (49766v), vol. 80, 1974, p. 106.
Chemical Abstracts, (62804n), vol. 83, 1975, p. 270.
Chemical Abstracts, (90:161368z), vol. 90, 1979, p. 607.
Gmelin, Gmelin Handbuch der Anorganischen Chemie, Springer-Verlag, 1982, pp. 76-78 (Translated).

*Primary Examiner*—Robert Spitzer

[57] ABSTRACT

Improved process for separating ethylsilane from silane by selective adsorption onto an effectively treated carbon bed and method of treatment of such carbon bed to enhance the selective adsorption of ethylsilane.

3 Claims, No Drawings

SILANE COMPOSITIONS AND PROCESS

This application is a division of application Ser. No. 07/622,771, filed Dec. 5, 1990, now abandoned.

BACKGROUND

Various methods exist for the production of electronic grade silicon and silane, one of its precursors. These methods include processes for the purification of silane before its reaction (e.g., thermal decomposition) to produce electronic grade silicon. For example, see Walker et al. (U.S. Pat. No. 4,537,759), incorporated in its entirety herein, and the references therein.

Particular examples of silicon and silane contaminants of concern are carbon containing species such as ethylene and ethylsilane. Ethylsilane can be separated from silane by distillation, but ethylene is very difficult to remove due to the close boiling points of ethylene and silane.

Ethylene can be separated from silane by passing a mixture of ethylene and silane through molecular sieves. However, such molecular sieve process can produce ethylsilane, introducing the newly produced ethylsilane as a contaminant. Some steps can be performed to reduce ethylsilane formation. For instance, see commonly-assigned United States application, Ser. No. 07/516,315, filed by W. S. Park on Apr. 30, 1990. There still remains a need for practical separation of ethylsilane from silane.

SUMMARY

Improved processes for separation of ethylsilane from silane have now been discovered which allow for the enhanced separation of ethylsilane from silane using treated carbon beds. These processes include treatment of the carbon bed both for initial and regenerative uses.

DESCRIPTION OF THE PREFERRED EMBODIMENTS

In one embodiment the present invention is a process for effectively treating a carbon bed to enhance its capacity for separating ethylsilane and silane in admixture. The process comprises effectively heating for a time the carbon bed at a pressure and at a temperature sufficient to enhance the capacity of the carbon bed for the selective adsorption of ethylsilane from a mixture predominantly comprising silane. When used throughout herein, the terms "treatment" and "pretreatment" and derivatives or variations thereof, whether used in a context to denote a particular sequence of events or not, are interchangeable as appropriate and in such manner as used by those skilled in the art.

The carbon bed to be treated in accordance with the invention comprises carbon particles which are suitable after treatment for the separation of ethylsilane from silane in admixture. Preferably, the carbon bed comprises as the carbon particles, granular carbon having a high surface area, more preferably a granular carbon black. These carbon granules have a pore volume size of preferably about 0.5 to about 1 cubic centimeter per gram and a particle density of preferably about 0.8 to about 0.9 gram per cubic centimeter. Unexpectedly, such carbon bed preferentially absorbs ethylsilane over silane. An example of suitable carbon structure commercially available is Calgon BPL granular carbon.

Embodiments of the invention can include a pretreatment of the carbon bed, such as before the initial or virgin use of the carbon bed, or as a post treatment after a previous use of the carbon bed, whether with or without a pretreatment of the carbon bed in accordance with the present invention. Accordingly, one embodiment is the treatment of the carbon bed as a portion of a regeneration process of a previously used carbon bed, preferably as the final step before use of the carbon bed for the separation of ethylsilane from silane in admixture.

The conditions of pressure for the treatment of the carbon bed can be held constant or can be varied. Pressures usable can range from sub-atmospheric to atmospheric (e.g., ambient) to superatmospheric (e.g., up to thirty atmospheres) pressures. Vacuum pressures can be used, but can be limited (e.g., 0.1 to 0.9 atmosphere) due to concerns of structural damage, handling and safety. About atmospheric pressures can be preferred because of these and other practical concerns.

The conditions of temperature for the treatment of the carbon bed can be held constant or can be varied. Temperatures usable can range from room temperature to about the decomposition temperature of the carbon bed, preferably at a temperature from about 150° C. to about 300° C., more preferably from about 180° C. to about 250° C.

The length of time for treatment can vary, depending in part upon the treatment conditions of pressure and temperature, the carbon bed particles, and the degree of efficiency desired for the separation of ethylsilane: generally the longer the length of time for treatment, the greater ethylsilane adsorption can be obtained up to a practical maximum, other factors (e.g., pressure, temperature) being held constant and the values thereof being as stated herein.

For example, in accordance with the invention, treatment of a carbon bed comprising a carbon structure suitable for the separation of ethylsilane and silane in a gaseous mixture can be performed by subjecting the carbon bed to a temperature of about 180° C. under vacuum for about three hours or under an inert gas (e.g., nitrogen) for a longer period of time (e.g., sixteen hours) After such treatment, the carbon bed has an enhanced capacity for separation of ethylsilane and silane in gaseous admixture.

In another embodiment the present invention is a process for removing ethylsilane from a silane predominant composition comprising the step of selectively adsorbing the ethylsilane with a carbon bed effectively treated at a temperature, at a pressure and for a time to significantly activate the carbon bed for the adsorption of the ethylsilane from the composition. During the treatment time, the temperature and/or pressure can be varied. This treatment can be by one of the embodiments illustrated hereinbefore or after, whether as an initial treatment or a regeneration of the carbon bed.

In another embodiment, the invention is a process for selectively adsorbing ethylsilane from a gaseous composition comprising silane and ethylsilane. This embodiment comprises the steps of:

(a) heating the carbon bed at a temperature of from about 150° C. to about 300° C. and at a pressure of from about 0.1 atmosphere to about 10 atmospheres for a time period of from about 1 hour to about 4 hours to effectively treat the carbon bed so as to significantly enhance the carbon bed's capability of adsorbing the ethylsilane, and (b) flowing the gaseous composition through the carbon bed treated in step (a) at a temperature and a pressure effective to produce the adsorption of ethylsilane from the composition.

The temperatures and pressures used in step (b) should be such as to maintain the silane and the ethylsilane in a gaseous state without significant damage to the treated carbon bed. Temperatures can range from ambient up to about the dissociation temperatures of the gas component, being mindful though of potential structural damage to the carbon bed. Likewise, pressures in step (b) can range from ambient to about 30 atmospheres, depending in part upon temperature and time. For instance, typical silane process pressures (e.g., about 20 atmospheres) can be used.

Selective adsorption of ethylsilane can continue for a period of time until the capacity of the carbon bed to selectively adsorb ethylsilane is exceeded, thereby permitting ethylsilane to pass through the carbon bed instead of being selectively adsorbed. Optionally, the carbon bed can then be regenerated (e.g., "activated" or "reactivated") by treatment of the carbon bed in accordance with the present invention to effectively produce a carbon bed with a renewed or enhanced capacity to adsorb ethylsilane from silane in admixture. This regenerated carbon bed can then be used again to separate ethylsilane from silane.

Accordingly, the present invention can be utilized in cyclic use of carbon beds. A typical carbon bed life could have the sequence of (1) pretreatment of the bed in accordance with the present invention before initial use, (2) process use of the carbon bed to separate ethylsilane from silane until exhaustion of the bed occurs, (3) regeneration of the bed by treatment in accordance with the invention, and recycle through (2) and (3) until the carbon bed can no longer be regenerated for practical use.

The following examples are provided to illustrate some of the features of the present invention. The experiments are not to be taken as limiting the scope of the invention.

EXAMPLES

Removal of Ethylsilane by Activated Carbon: A U-tube bed (3/8"×12", SS316) containing carbon (Whitco JXC 8×10, 10.7 grams) was connected to a manifold system for the on-line gas chromatograph (GC) injection of samples via Nupro ® bellow valves (¼" connections). The carbon bed was pretreated by heating at 180° C. under vacuum for more than 3 hours. A mixture containing ethylsilane and silane was prepared by condensing silane into a cylinder containing ethylsilane under vacuum at liquid $N_2$ temperature. The mixture was then thawed and allowed to stand in mixture at room temperature overnight. The gas mixture was then analyzed by on-line GC as being 31% ethylsilane and 69% silane. The valve directly connecting the gas cylinder to the GC was closed and the valves connecting the U-tube carbon bed to the GC were opened. The gas mixture was passed through the U-tube carbon bed. The effluent from the bed was analyzed, showing only silane with 0.007% of ethylsilane.

Capacity Measurement: A capacity measurement of the carbon bed for the mixture of silane and ethylsilane was performed. More silane was condensed into the above cylinder at liquid $N_2$ temperature and let stand in mixture overnight at room temperature. Meanwhile, the carbon bed was regenerated by heating at 180° C. under vacuum overnight. The mixture was analyzed as containing 16% ethylsilane. Then the capacity for the gas was determined by measuring the pressure drop of the gas upon exposure of the gas to the regenerated carbon bed. The pressure dropped about 12 psi from 60 psi. The capacity was calculated as being approximately 0.92 mmole per gram of carbon. The capacity for ethylsilane was measured by passing the mixture through the column until breakthrough of ethylsilane occurred. However, no breakthrough was observed until an amount equivalent to 0.7 mmole of ethylsilane per gram of carbon (56 psi of pressure drop, 8.96 psi for ethylsilane) was removed. Therefore, the capacity was greater than 0.7 mmole/gram and was in the vicinity of 0.9 mmole/gram. A small peak (less than 0.007% relative to silane) of ethylsilane retention time could only be detected at the highest sensitivity of the TCD detector of the GC (Varian 3700, Detector Temperature at 100° C., Detector Current 280 mA) while the feed mixture contained 16% ethylsilane.

What is claimed is:

1. A process for selectively absorbing ethylsilane from a gaseous composition predominant in silane comprising the steps of:
    (a) heating a carbon bed at a temperature of from about 150° C. to about 300° C. and at a pressure of from about 0.1 atmosphere to about 10 atmospheres for a time period of from about 1 hour to about 4 hours to effectively treat said carbon bed so as to significantly enhance said carbon bed's capability of absorbing said ethylsilane, and
    (b) flowing said gaseous composition through the carbon bed treated in step (a) at a temperature and a pressure effective to produce the absorption of said ethylsilane from said composition.

2. The process of claim 1 wherein the pressure in step (b) is about twenty atmospheres.

3. A process for removing ethylsilane from a silane predominant composition comprising the steps of:
    (a) selectively absorbing said ethylsilane with a carbon bed effectively treated by heating at a temperature of about 150°–300° C., at a pressure of from about 0.1 atmosphere to about 30 atmospheres and for a time period of from about 1 hour to about 16 hours to significantly activate the carbon bed for the absorption of the ethylsilane from the silane predominant composition, and
    (b) flowing the silane predominant composition through the carbon bed treated in step (a) at a temperature of from about ambient to about the dissociation temperature of the silane predominant composition and a pressure of from ambient to about 30 atmospheres to produce the absorption of said ethylsilane from the silane predominant composition.

* * * * *

UNITED STATES PATENT AND TRADEMARK OFFICE
CERTIFICATE OF CORRECTION

PATENT NO.  : 5,290,342

DATED       : March 1, 1994

INVENTOR(S) : Andrew O. Wikman; Won S. Park; Charles R. Everly

It is certified that error appears in the above-indentified patent and that said Letters Patent is hereby corrected as shown below:

Column 4, Line 28, reads ". . . absorbing ethylsilane" and should read -- . . . adsorbing ethylsilane --.

Column 4, Line 37, reads "of absorbing said . . ." and should read -- of adsorbing said . . . --.

Column 4, Line 40, reads ". . . produce the absorption of" and should read -- . . . produce the adsorption of --.

Column 4, Line 46, reads "(a) selectively absorbing . . ." and should read -- (a) selectively adsorbing . . . --.

Column 4, Line 52, reads "the absorption of . . ." and should read -- the adsorption of . . . --.

UNITED STATES PATENT AND TRADEMARK OFFICE
CERTIFICATE OF CORRECTION

PATENT NO. : 5,290,342
DATED : March 1, 1994
INVENTOR(S) : Andrew O. Wikman; Won S. Park; Charles R. Everly It is certified that error appears in the above-indentified patent and that said Letters Patent is hereby corrected as shown below:

Column 4, Line 59, reads ". . . produce the absorption of" and should read -- . . . produce the adsorption of --.

Signed and Sealed this

Second Day of August, 1994

BRUCE LEHMAN

Attest:

*Attesting Officer*                    *Commissioner of Patents and Trademarks*